(12) United States Patent
Banks-Binici et al.

(10) Patent No.: US 7,496,760 B2
(45) Date of Patent: Feb. 24, 2009

(54) SYSTEM, METHOD AND PROGRAM PRODUCT FOR MANAGING USER ACCOUNT INFORMATION

(75) Inventors: John Banks-Binici, Westborough, MA (US); Sylvain P. Galineau, Dublin 1 (IE); Jonathan J. Hewitt, Exeter, NH (US); Joseph T. Wissmann, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 963 days.

(21) Appl. No.: 10/350,826

(22) Filed: Jan. 23, 2003

(65) Prior Publication Data

US 2004/0148517 A1 Jul. 29, 2004

(51) Int. Cl.
*H04L 9/00* (2006.01)
(52) U.S. Cl. ............... 713/182; 713/155; 713/161; 713/170; 705/26; 705/67; 726/2; 726/4
(58) Field of Classification Search ............ 713/155, 713/170, 182, 161; 705/64, 77, 26, 67; 726/2, 726/4
See application file for complete search history.

(56) References Cited

U.S. PATENT DOCUMENTS

| | | | | |
|---|---|---|---|---|
| 5,809,144 A | * | 9/1998 | Sirbu et al. | 705/53 |
| 6,829,595 B2 | * | 12/2004 | Justice | 705/64 |
| 6,996,718 B1 | * | 2/2006 | Henry et al. | 713/182 |
| 7,100,049 B2 | * | 8/2006 | Gasparini et al. | 713/170 |

* cited by examiner

*Primary Examiner*—Emmanuel L Moise
*Assistant Examiner*—Paul Callahan
(74) *Attorney, Agent, or Firm*—John R. Pivinichny; Hoffman Warnick

(57) ABSTRACT

Under the present invention, a central system in communication with a central directory is provided. The central system also communicates with one or more ancillary systems that each communicate with an ancillary storage unit. User account information is initially stored in the central directory according to unique identifiers. When a triggering event occurs (e.g., when he/she attempts to access an ancillary system, or when he/she is listed as an intended recipient of an electronic mailing message), the user's account information will be located within the central directory according to his/her unique identifier. Upon location, the account information is automatically communicated to the appropriate ancillary storage unit. Thus, the present invention provides "just in-time" synchronization of account information between the central directory and the ancillary storage unit.

14 Claims, 2 Drawing Sheets

US 7,496,760 B2

SYSTEM, METHOD AND PROGRAM PRODUCT FOR MANAGING USER ACCOUNT INFORMATION

BACKGROUND OF THE INVENTION

1. Field of the Invention

The present invention generally relates to a system, method and program product for managing user account information. Specifically, the present invention allows account information that is stored in a central directory to be synchronized with an ancillary storage unit without relying on time-based standards.

2. Background Art

As computer technology becomes more advanced, businesses are increasingly implementing computerized solutions to meet their growing requirements. For example, today a business might implement various systems to provide particular functionality such as electronic mail services, payroll management, sales management, etc. Typically, these systems are arranged as "ancillary" systems around a "central" system. In providing such extensive technology, however, security and user account management can be vital. In the case of the former, it is important for the business to ensure that users can only access the particular systems and perform the functions for which they have been granted permission. For example, it could be the case that users "A" and "B" are authorized to access the payroll management system. However, these users could have different user settings (e.g., varying levels of permissions and template settings) within the systems. For example, user "A" might only have permission to view payroll data, while user "B" might have permission to both view and edit the payroll data. Moreover, each user might have customized his/her interface within the payroll management system a particular way (e.g., with certain colors, etc.). Thus, upon accessing the payroll management system, the users should be presented with their customized interfaces.

Historically, user settings such as permissions levels, template settings, personal address books, etc. have stored as "user account information" within a central directory that communicates with the central system. Once stored, the user account information must be communicated to the appropriate ancillary storage units. Unfortunately, to date, the communication of user account information has been performed only at predetermined time intervals (e.g., once a day, every four hours, etc.). This is especially problematic when an employee is terminated or experiences a change in their account information (e.g., changed permission level, changed name, etc.). For example, if an employee is terminated, although his/her user account may have been deleted from the central directory, it could still exist on the ancillary storage units. Thus, the terminated employee might still have access to various ancillary systems. Obviously, this type of delay can expose the business to great risk.

In view of the foregoing, there exists a need for a system, method and program product for managing user account information. Specifically, a need exists for a user's account information to be stored in a central directory according to a unique identifier. A further need exists for the account information to be located and then communicated to an ancillary storage unit upon authentication of the user.

SUMMARY OF THE INVENTION

In general, the present invention provides a system, method and program product for managing user account information. Specifically, under the present invention, a central system in communication with a central directory is provided. The central system also communicates with one or more ancillary systems that each communicate with an ancillary storage unit. User account information is initially stored in the central directory according to unique identifiers. When a triggering event such as when a user attempts to access an ancillary system, or when he/she is listed as an intended recipient of an electronic mailing message occurs, the user's account information will be located within the central directory according to his/her unique identifier. Upon location, the account information is automatically communicated to the appropriate ancillary storage unit. Thus, the present invention provides "just in-time" synchronization of account information between the central directory and the ancillary storage unit.

According to a first aspect of the present invention, a system for managing user account information is provided. The system comprises: (1) an ancillary system in communication with an ancillary storage unit; (2) a central system in communication with a central directory, wherein the central directory stores account information for authorized users of the ancillary system; and (3) an account system for identifying an entry within the central directory corresponding to a particular authorized user of the ancillary system, and for automatically communicating account information corresponding to the particular authorized user from the central directory to the ancillary storage unit upon identification of the entry.

According to a second aspect of the present invention, a method for managing user account information is provided. The method comprises: (1) providing an ancillary system in communication with an ancillary storage unit; (2) providing a central system in communication with a central directory, wherein the central directory stores account information for authorized users of the ancillary system; (3) identifying an entry in the central directory that corresponds to a particular authorized user of the ancillary system; and (4) communicating account information corresponding to the particular authorized user from the central directory to the ancillary storage unit, upon identification of the entry.

According to a third aspect of the present invention, a program product stored on a recordable medium for managing user account information is provided. When executed, the program product comprises: (1) program for identifying an entry in a central directory that corresponds to an authorized user of an ancillary system, wherein the ancillary system communicates with an ancillary storage unit; (2) program code for locating account information corresponding to the authorized user within a central directory based on a unique identifier in the entry; and (3) program code for communicating the located account information corresponding to the user from the central directory to the ancillary storage unit.

Therefore, the present invention provides a system, method and program product for managing user account information.

BRIEF DESCRIPTION OF THE DRAWINGS

These and other features of this invention will be more readily understood from the following detailed description of the various aspects of the invention taken in conjunction with the accompanying drawings in which.

Figure 1:
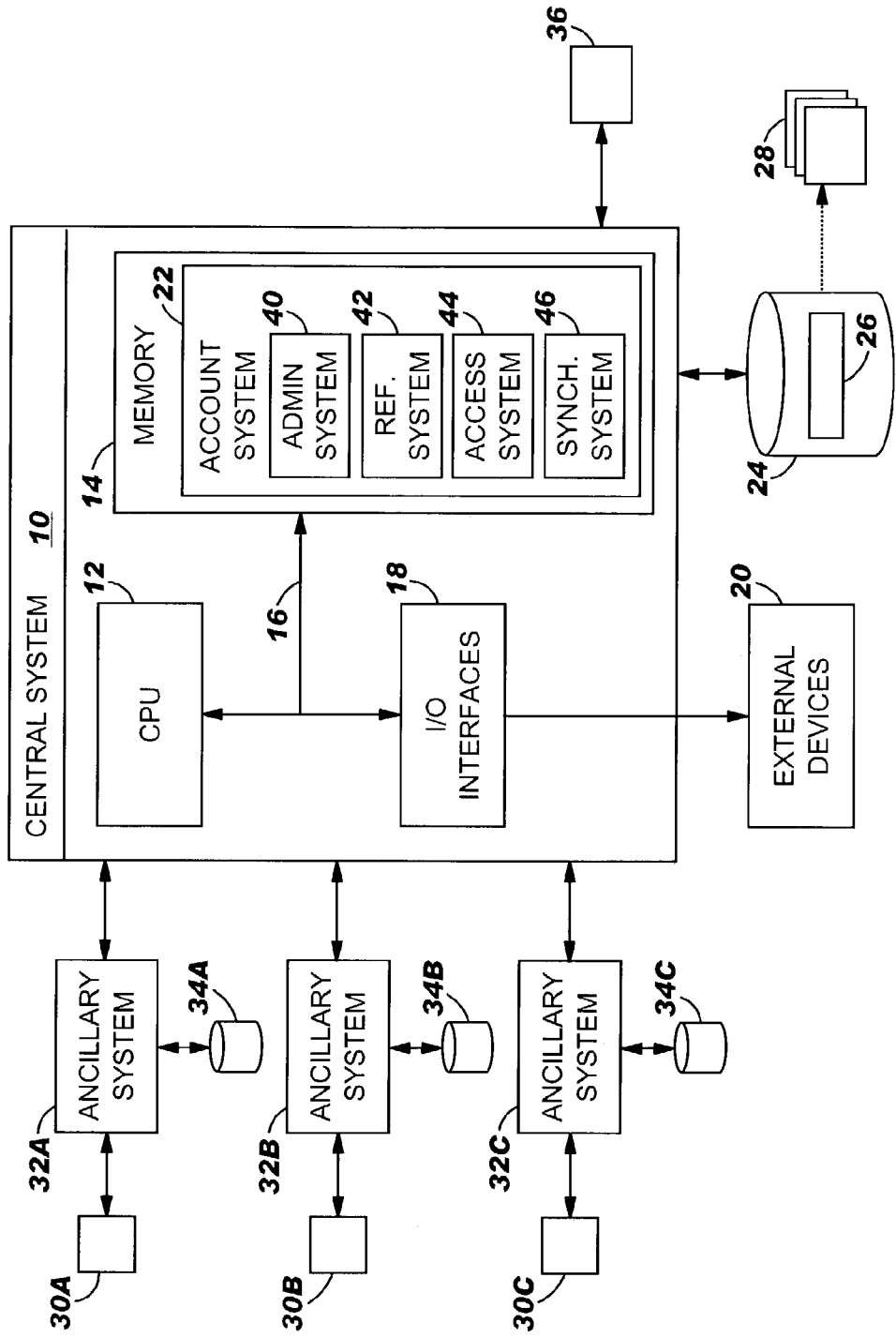
FIG. 1 depicts a system for managing user account information according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a system, method and program product for managing user account information. Specifically, under the present invention, a central system in communication with a central directory is provided. The central system also communicates with one or more ancillary systems that each communicate with an ancillary storage unit. User account information is initially stored in the central directory according to unique identifiers. When a triggering event such as when he/she attempts to access an ancillary system, or when he/she is listed as an intended recipient of an electronic mailing message occurs, the user's account information will be located within the central directory according to his/her unique identifier. Upon location, the account information is automatically communicated to the appropriate ancillary storage unit. Thus, the present invention provides "just in-time" synchronization of account information between the central directory and the ancillary storage unit.

Referring now to FIG. 1, a system for managing user account information according to the present invention is shown. As depicted, the system includes central system 10 and ancillary systems 32A-C. Central system 10 communicates with central directory 24, while ancillary systems 32A-C communicate with ancillary storage units 34A-C. Ancillary systems 32A-C are generally intended to represent any functional program or system that can exchange information with central system 10. For example, ancillary systems 32A-C could include an electronic mailing system, a payroll management system and a sales management system that operate in a business environment "around" central system 10.

In a typical embodiment, central directory 24 contains user account information 28 for all users 30A-C authorized to access ancillary systems 32A-C. Specifically, central directory 24 includes an account or entry 26 for each user 30A-C. Each entry 26 generally includes authentication information (e.g., a Distinguished Name) and a unique identifier (e.g., a social security number, an employee identification number, etc.) that corresponds to a specific user. As will be further described below, when a user is authenticated, he/she will be associated with his/her entry 26. Once associated with entry 26, the unique identifier therein will be used to locate his/her account information 28, which will then be automatically communicated to one or more ancillary storage units 34A-C. Under the present invention, user account information 28 can include any type of user settings and/or user-specific information. For example, user account information can include personal information (e.g., the user's full name and address), permission levels, template options, address book information, a calendar, etc. As indicated above, under previous systems, user account information was transferred to ancillary storage units according to predetermined time intervals. Because of the latency inherent in such periodic transfers, the numerous problems discussed above often resulted.

As shown, central system 10 generally includes central processing unit (CPU) 12, memory 14, bus 16, input/output (I/O) interfaces 18 and external devices/resources 20. CPU 12 may comprise a single processing unit, or be distributed across one or more processing units in one or more locations, e.g., on a client and server. Memory 14 may comprise any known type of data storage and/or transmission media, including magnetic media, optical media, random access memory (RAM), read-only memory (ROM), a data cache, a data object, etc. Moreover, similar to CPU 12, memory 14 may reside at a single physical location, comprising one or more types of data storage, or be distributed across a plurality of physical systems in various forms.

I/O interfaces 18 may comprise any system for exchanging information to/from an external source. External devices/resources 20 may comprise any known type of external device, including speakers, a CRT, LED screen, hand-held device, keyboard, mouse, voice recognition system, speech output system, printer, monitor, facsimile, pager, etc. Bus 16 provides a communication link between each of the components in central system 10 and likewise may comprise any known type of transmission link, including electrical, optical, wireless, etc. In addition, although not shown, additional components, such as cache memory, communication systems, system software, etc., may be incorporated into central system 10. It should be understood that ancillary systems 32A-C are typically loaded on computerized systems having components (e.g., CPU, memory, etc.) similar to central system 10. Such components have not been shown for brevity purposes only.

Central directory 24 provides storage for user account information. Typically, central directory 24 is implemented under the Lightweight Directory Access Protocol (LDAP). As known in the art, an LDAP directory is organized in a simple tree-based hierarchy that could include the following levels:

A root directory that branches out to;
Countries, each of which branches out to;
Organizations that branch out to;
Organizational units (divisions, departments, etc.) that branch out to;
Individuals (e.g., people, files, shared resources, etc.).

Ancillary storage units 34A-C can be anything capable of storing information. For example, if ancillary system 32A is an electronic mailing system, ancillary storage unit 34A could be a set of mailboxes. Alternatively, ancillary storage units 34A-C could be directories. In any event, central directory 24 and/or ancillary storage units 34A-C could each include one or more storage devices, such as a magnetic disk drive or an optical disk drive. In another embodiment, central directory 24 and/or ancillary storage units 34A-C include data distributed across, for example, a local area network (LAN), wide area network (WAN) or a storage area network (SAN) (not shown). Central directory 24 and/or ancillary storage units 34A-C may also be configured in such a way that one of ordinary skill in the art may interpret them to each include one or more storage devices.

It should be appreciated that the specific quantity of ancillary systems 32A-C and ancillary storage units 34A-C depicted herein is for illustrative purposes only, and many variations could be implemented. Specifically, the present invention could be implemented with any quantity of ancillary systems 32A-C and/or ancillary storage units 34A-C. To this extent, each ancillary system 32A-C need not communicate with a separate ancillary storage unit 34A-C. It should also be understood that communication between ancillary systems 32A-C and central system 10 can occur via a direct hardwired connection (e.g., serial port), or via an addressable connection in a client-server (or server-server) environment which may utilize any combination of wireline and/or wireless transmission methods. In the case of the latter, the server and client may be connected via the Internet, a wide area network (WAN), a local area network (LAN), a virtual private network (VPN) or other private network. The server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

Loaded in memory 14 of central system 10 is account system 22, which includes administrator system 40, reference system 42, access system 44 and synchronization system 46. Under the present invention, account system 22 will provide synchronization of user account information 28 between central directory 24 and ancillary storage units 34A-C without relying on time-based standards. Synchronization of account information under the present invention includes the creation of new accounts (e.g., for new employees) as well as the updating and deletion of existing accounts.

To accommodate a new employee/user (e.g., user 30A), a new account/entry 26 will be created, and user account information 28 will be designated in central directory 24. In a typical embodiment, the new entry 26 and account information 28 will be designated by administrator 36 via administrator system 40. As indicated above, the new entry 26 generally includes certain authentication information/credentials and a unique identifier pertaining to the new user. The authentication information can be any type of information that can be used to later authenticate the new user and associate him/her with entry 26. For example, the authentication information can include a Distinguished Name such as a directory expression that corresponds to the user's position within the organizational hierarchy, a user name and password, etc. The unique identifier is a set of values such as a social security number or an employee identification number that corresponds exclusively to the new user. It will be used to locate and access the new user's account information 28 (e.g., permissions, template options, address book, calendar, etc.) in central directory 24.

Figure 2:
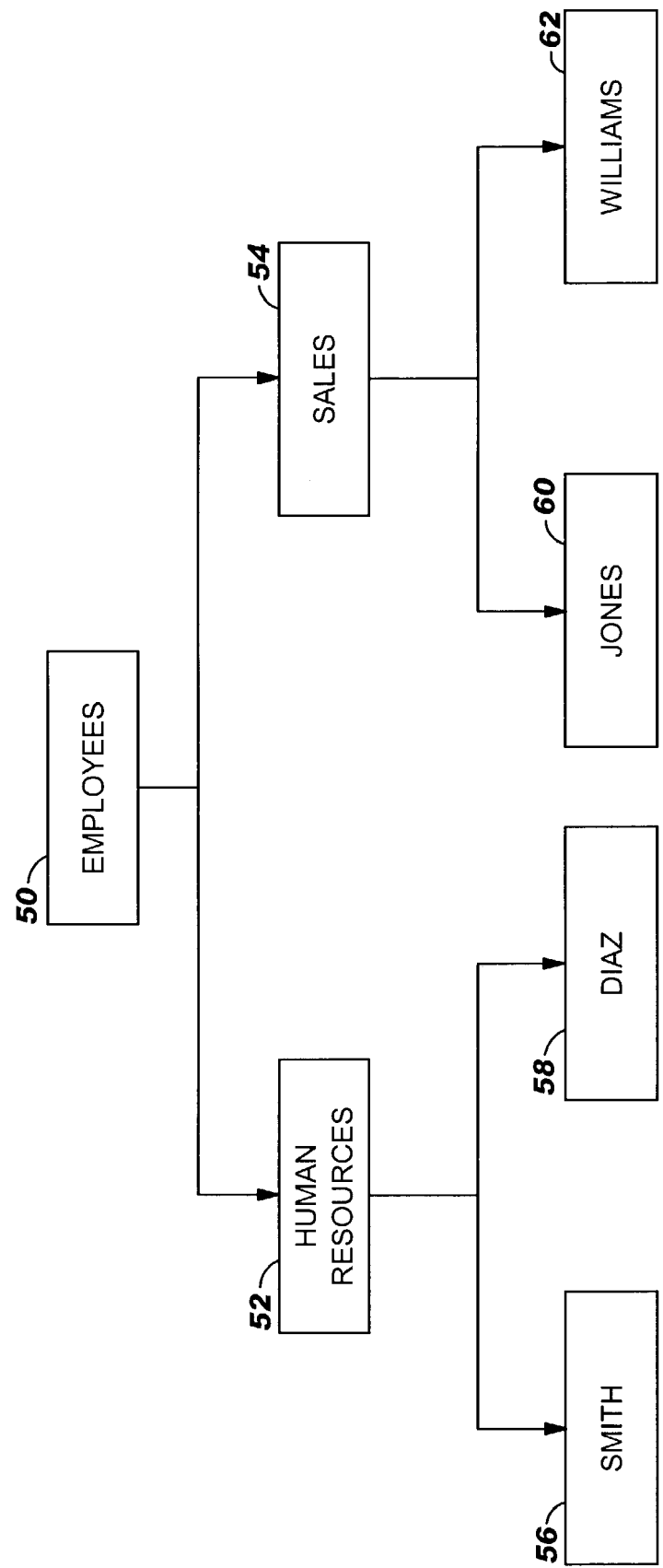
FIG. 2 depicts an exemplary hierarchical diagram of an organization.

In providing the new user's account information 28 to central directory 24, administrator 36 could associate the new user with certain policies or configuration templates that define the new user's permission levels and interface(s). To this extent, association with particular policies and configuration templates could be based on the new user's Distinguished Name. For example, referring to FIG. 2, an exemplary organizational hierarchy is shown. As depicted, the hierarchy includes a root node labeled employees 50. Under employees 50, are child nodes that correspond to departments, namely, human resources 52 and sales 54. Underneath human resources 52 are employees Smith 56 and Diaz 58, while underneath sales are employees Jones 60 and Williams 62. Thus, a "Distinguished Name" for employee Smith 56 could be "/employees/human resources/Smith." Administrator 36 could associate this Distinguished Name with particular policies and configuration templates. For example, since employee Smith 56 is in human resources 52, he/she might be associated with a policy that does not grant access to sales-based ancillary systems. Moreover, whenever employee Smith 56 logs-in to a particular ancillary system, he/she might be presented with a certain interface that was defined according to a particular configuration template.

In utilizing a "Distinguished Name" under the present invention, administrator 36 should ensure that changes to the hierarchical structure are considered. For example, if employee Smith 56 transfers to Sales department 54, his directory expression will change. This may be accompanied by changes to certain permissions for employee Smith 56 (e.g., employee Smith 56 may no longer be authorized to access human resource-based systems such as payroll).

In any event, once account information 28 for the new user has been provided, it will be "catalogued" in central directory 24 according to the new user's unique identifier. At this point, this information can be synchronized (communicated) to ancillary storage units 34A-C. Specifically, without requiring any further interaction by administrator 36, or relying on a time-based transmission, the occurrence of a "triggering event" will cause the account information (and entry) for the new user can be automatically communicated to ancillary storage units 34A-C. Under the present invention, triggering events include, among other things: (1) authentication (e.g., HTTP, POP3, IMAP, etc.) of the new user pursuant to his/her attempts to access an ancillary system 32A-C; and (2) validation of the new user pursuant to the attempted transmission of an electronic message to the new user by an existing user. In both cases, entry 26 corresponding to the new user is identified and referenced in central directory 24. For example, assuming the new user is user 30A, once his/her account has been created, user 30A can attempt to access or "log-in" to ancillary system 32A. In a typical embodiment, reference system 42 will authenticate user 30A by comparing log-in information/credentials for user 30A (e.g., Distinguished Name, etc.) to the authentication information of the entries within central directory 24 to determine: (1) whether user 30A is a known or valid user; and (2) whether he/she is authorized to access ancillary system 32A. Based on the above description, this comparison should result in a match to entry 26. It should be appreciated that authentication under the present invention can accommodate any protocol that may be implemented. Examples include, among other, HTTP, POP3 and IMAP.

In any event, once user 30A is authenticated and entry 26 has been identified, access system 44 will locate the appropriate account information 28 for user 30A based on the unique identifier in entry 26. Specifically, access system 44 will locate and retrieve the account information catalogued according to user 30A's unique identifier. Upon location, synchronization system 46 will automatically communicate the account information 28 to ancillary storage unit 34A. Thus, an account for user 30A has been automatically created. The synchronization of ancillary storage unit 34A in this manner could involve both the creation of an entry for user 30A as well as the storage of his/her account information according to the unique identifier. In any event, unlike previous systems that communicated the account information according to certain predetermined time periods, the present invention communicates the account information "just in-time."

It should be understood that user 30A logging into ancillary system 32A is not the only event that can trigger synchronization under the present invention. For example, assume after an account has been created for user 30A in central directory 24, but before user 30A logs-in to ancillary system 32A, user 30A's manager wishes to send user 30A a "welcome" electronic mail message (e.g., via ancillary system 32A). Upon attempted transmission of the electronic mail message, reference system 42 will perform a "lookup" of user 30A's entry in central directory 24 (e.g., based on user 30A's name as indicated in the electronic mail message) to determine/verify if he/she is a valid or known user (e.g., based on the recipient name in the intended message and the entries 26 in central directory 24). Then, as indicated above, access system 44 will locate user 30A's account information and synchronization system 46 will communicate the same to ancillary storage unit 34A. Alternatively, reference system 24 could be programmed to determine whether user 30A's entry has been "flagged" with a predetermined attribute indicating that user 30A should be provisioned in ancillary storage unit(s) 34A-C. This alternative prevents account information 28 from being communicated to ancillary storage units 34A-C until it has been deliberately flagged. It could be the case that administrator 36 might not desire for account information 28 in central database 24 to be immediately available for communication to ancillary storage units 34A-C.

In any event, once user 30A's account information has been established and synchronized, it can be updated or deleted in a similar manner. For example, assume user 30A gets married and changes her name and address. In this case, administrator 36 would change user 30A's name and address (and Distinguished Name) in central directory 24. When user 30A later attempts to log-in to ancillary system 32A under her new name, or when she is listed by her new name as an intended recipient of an electronic mail message, authentication or lookup would take place based on the new name as changed in central directory 24. Because the information was already changed in central directory 24, user 30A would still be matched with the correct entry 26. Then, based on the unique identifier in entry 26, the updated account information 28 will be located in central directory 24 and communicated to (reconciled with) user 30A's account information in ancillary storage unit 34A. Thus, no reliance on the accuracy of the account information in ancillary storage unit 34A, or on a scheduled communication of information is required. This alleviates the problems associated with periods of delay from the time in which the account information was changed in central directory 24 to when it is later communicated to ancillary system 34A.

In the event that user 30A is terminated, administrator 36 could delete user 30A's account from central directory 14. The deletion of the account could then cause synchronization system 46 to automatically remove the corresponding information from any ancillary storage unit in which it is stored. Thus, user 30A would be immediately denied access to ancillary system 32A.

It should be understood that although not required, synchronization under the present invention could be combined with time-based synchronization. For example, synchronization could occur upon authentication of user 30A as well as at fixed time intervals. It should also be understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A system for managing user account information, comprising:
    an ancillary system in communication with an ancillary storage unit, wherein the ancillary storage unit is not a web browser;
    a central system in communication with a central directory, wherein the central directory stores account information for authorized users of the ancillary system; and
    an account system for identifying an entry within the central directory corresponding to a particular authorized user of the ancillary system, and for automatically communicating account information corresponding to the particular authorized user from the central directory to the ancillary storage unit upon identification of the entry, wherein the account system identifies the entry in the central directory pursuant to an authentication of the particular authorized user, and wherein the particular authorized user is authenticated upon an attempt to log-in to the ancillary system, wherein the authentication is selected from the group consisting of POP3 authentication and IMAP authentication.

2. The system of claim 1, wherein the entry includes a unique identifier corresponding to the particular authorized user, and wherein the account information corresponding to the particular authorized user is identified in the central directory based on the unique identifier.

3. The system of claim 1, wherein the ancillary storage unit is selected from the group consisting of a magnetic disk drive and optical disk drive.

4. The system of claim 1, wherein the ancillary system is selected from the group consisting of electronic mailing system, payroll management system, and sales management system.

5. The system of claim 1, wherein the account system identifies the entry in the central directory pursuant to a transmission of an electronic mail message to the particular authorized user.

6. The system of claim 1, wherein the account system comprises: a reference system for identifying the entry based on the particular authorized user; an access system for locating the account information corresponding to the particular authorized user within the central directory based on a unique identifier within the entry; and a synchronization system for communicating the account information corresponding to the particular authorized user from the central directory to the ancillary storage unit.

7. The system of claim 6, wherein the account system further comprises an administrator system for administering the account information in the central directory.

8. A program product stored on a computer readable storage medium for managing user account information, which when executed, comprises: program code for identifying an entry in a central directory that corresponds to an authorized user of an ancillary system, wherein the ancillary system communicates with an ancillary storage unit, wherein the ancillary storage unit is not a web browser; program code for locating account information corresponding to the authorized user within a central directory based on a unique identifier in the entry, wherein the entry is identified pursuant to an authentication of the authorized user, wherein the authorized user is authenticated upon an attempt to log-in to the ancillary system, wherein the authentication is selected from the group consisting of a POP3 authentication and a IMAP authentication; and program code for communicating the account information corresponding to the user from the central directory to the ancillary storage unit.

9. The program product of claim 8, further comprising program code for administering account information in the central directory.

10. The program product of claim 8, wherein the ancillary storage unit is selected from the group consisting of a magnetic disk drive and optical disk drive.

11. The program product of claim 8, wherein the ancillary system is selected from the group consisting of an electronic mailing system, payroll management system, and sales management system.

12. The program product of claim 8, wherein the account information corresponding to the authorized user is located in the central directory based on a unique identifier.

13. The program product of claim 8, wherein the account information corresponding to the new user is automatically communicated from the central directory to the ancillary storage unit upon identification of the entry.

14. The program product of claim 8, wherein the program product is loaded on a central system that communicates with the central directory.

* * * * *